United States Patent [19]

Arakawa

[11] Patent Number: 4,527,862
[45] Date of Patent: Jul. 9, 1985

[54] LIQUID CRYSTAL DISPLAY KEYBOARD

[75] Inventor: Kazuhiro Arakawa, Yamato, Japan

[73] Assignee: Canon Kabushiki Kaisha, Tokyo, Japan

[21] Appl. No.: 556,992

[22] Filed: Dec. 1, 1983

[30] Foreign Application Priority Data

Dec. 3, 1982 [JP] Japan ................................ 57-211297

[51] Int. Cl.³ .............................................. G02F 1/13
[52] U.S. Cl. ................................ 350/334; 350/331 R; 350/339 R
[58] Field of Search ............... 350/331 R, 334, 332, 350/339 R

[56] References Cited

U.S. PATENT DOCUMENTS

| 3,956,745 | 5/1976 | Ellis | 350/331 R X |
| 4,017,848 | 4/1977 | Tannas, Jr. | 350/334 X |
| 4,078,257 | 3/1978 | Bagley | 350/334 X |
| 4,224,615 | 9/1980 | Penz | 350/331 R X |
| 4,313,108 | 1/1982 | Yoshida | 350/331 R X |

Primary Examiner—John K. Corbin
Assistant Examiner—Richard Gallivan
Attorney, Agent, or Firm—Fitzpatrick, Cella, Harper & Scinto

[57] ABSTRACT

A liquid crystal display keyboard has a keyboard which is arranged on a liquid crystal display and has upper and lower conductive films each having transparent electrodes arranged in spaced and facing relation to each other. An elastic member is arranged on the upper transparent conductive film.

5 Claims, 5 Drawing Figures

LIQUID CRYSTAL DISPLAY KEYBOARD

BACKGROUND OF THE INVENTION

1. Field of the Invention

The present invention relates to a liquid crystal display keyboard having a transparent keyboard on a liquid crystal display.

2. Description of the Prior Art

A structure of a prior art liquid crystal display keyboard is shown in FIG. 1.

In FIG. 1, numeral 1 denotes a liquid crystal display having a polarizing plate 2 bonded thereon and a transparent conductive film 3 bonded thereon.

A plurality of stripe-shaped transparent electrodes 4 are formed on the transparent conductive film 3.

The transparent electrodes 4 are formed by depositing indium oxide on an entire surface of the transparent conductive film 3 by sputtering or vacuum deposition techniques and etching it to a predetermined pattern to form the transparent stripe electrodes.

A frame-shaped spacer 5 is bonded to an upper surface of the liquid crystal 1 to surround the polarizing plate 2 and the transparent conductive film 3, and another transparent conductive film 6 is bonded to top edges of the spacer 5. Transparent stripe electrodes 7 are formed on the lower surface of the transparent conductive film 6 to be transverse to the underlying transparent electrodes 4.

The upper and lower transparent electrodes 4 and 7 are spaced by the spacer 5 and crosspoints of those formed key input areas.

In order to input a key data, the upper transparent conductive film 6 is depressed by a special pen P as shown in FIG. 2 to bring the upper and lower transparent electrodes 4 and 7 into contact.

However, when the upper transparent conductive film 6 is depressed by the pen P, the transparent conductive film 6 and the transparent electrodes 7 are bent with a relatively large radius of curvature so that a relatively large force is concentrated to the lower transparent electrode 4.

As a result, the lower transparent electrodes 4 are bent. The transparent electrodes 4 have poor adhesivity to the transparent conductive film 3 and as they are bent a number of times, they are broken and the key entry is disabled.

When a character is drawn by the pen P to recognize a pattern, the pen is slid. As a result, a small wave is created in the transparent conductive film 6 which pen P contacts. The transparent electrodes 4 are correspondingly depressed and their durability is lowered to an extent that they cannot operate correctly.

SUMMARY OF THE INVENTION

It is an object of the present invention to provide a liquid crystal display keyboard having a high durability, which is free from broken wires.

BRIEF DESCRIPTION OF THE DRAWINGS

FIGS. 1 and 2 show a prior art structure in which FIG. 1 shows a longitudinal sectional view before the key is depressed and FIG. 2 shows a longitudinal sectional view when the key is depressed, FIGS. 3 and 4 show a first embodiment of the present invention in which FIG. 3 shows a longitudinal sectional view before a key is depressed and FIG. 4 shows a longitudinal sectional view when the key is depressed.

DETAILED DESCRIPTION OF THE PREFERRED EMBODIMENTS

Figure 1:
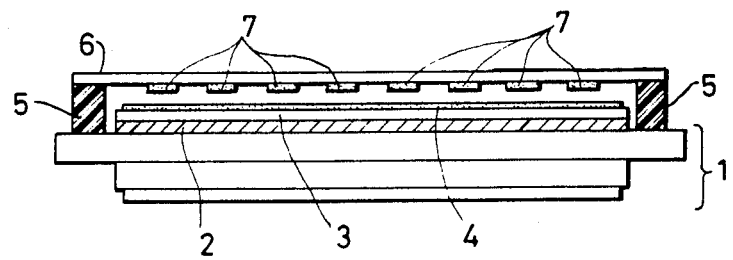
Figure 2:
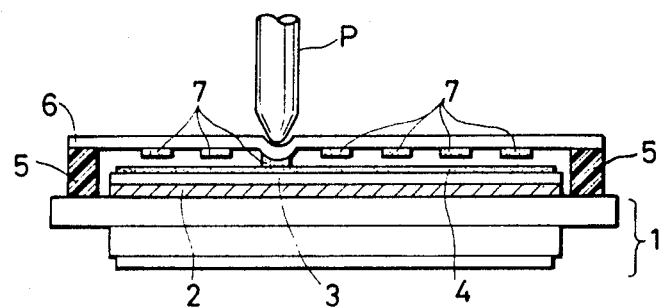
Figure 3:
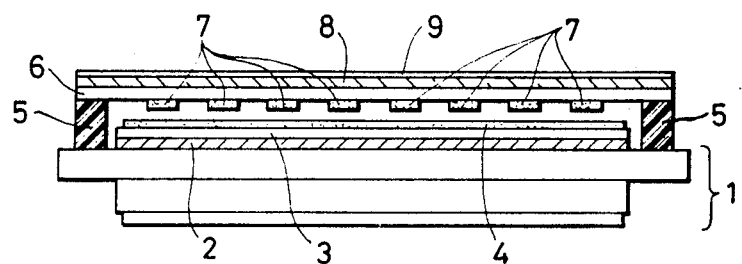
Figure 4:
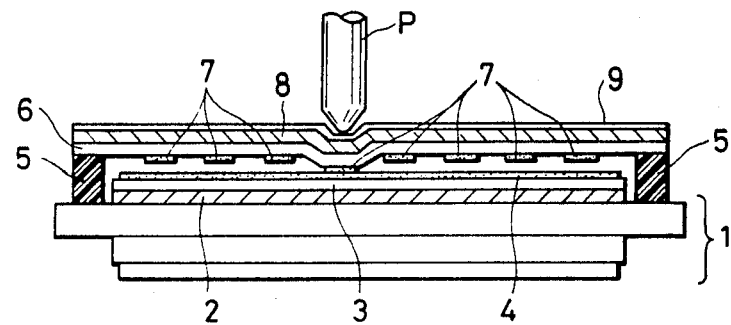

FIGS. 3 and 4 show a first embodiment of the present invention, in which the like elements to those shown in FIGS. 1 and 2 are designated by the like numerals and the explanation thereof is omitted.

In the present embodiment, a transparent elastic film 8 is bonded to the upper surface of the flexible transparent conductive film 6, and a flexible transparent film 9 is bonded thereon.

Because of the three-layer structure of the overlying transparent conductive film 6, it assumes a shape shown in FIG. 4 when the overlying transparent conductive film 6 is depressed by the pen P.

Because of the three-layer structure of the overlying transparent conductive film 6, the radius of curvature of the transparent conductive film 6 depressed by the pen P is small, the contact area to the underlying transparent electrode 4 increases, the force is diversed and the radius of curvature of the transparent electrode 4 is also small.

When a character is drawn by the pen P for pattern recognition, the wave created when the pen P is slid is absorbed by the transparent film 9 and the elastic film 8 so that no wave is created in the underlying transparent electrodes 4; the breaking of the transparent electrodes 4 is prevented and the durability of the transparent keyboard is remarkably improved.

Figure 5:
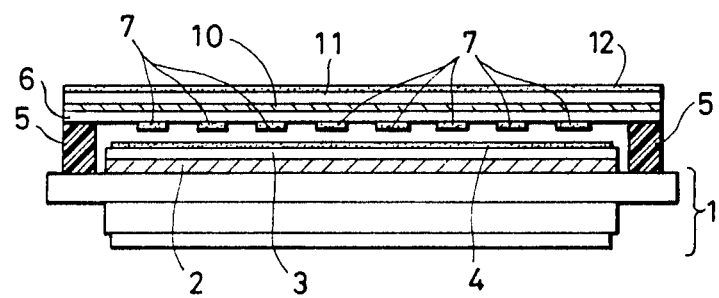
FIG. 5 is a longitudinal sectional view of a second embodiment of the present invention.

FIG. 5 shows a second embodiment of the present invention. In the present embodiment, a transparent film 11 is bonded to the upper surface of the upper flexible transparent conductive film 6 by an adhesive material 10.

The upper surface of the transparent film 11 is hardened by surface hardening agent to form a hardened layer 12.

With this structure, the upper transparent conductive film 6 is of three-layer structure like the previous embodiment so that the breaking of wires by the depression of pen P is prevented and durability is likewise improved.

The hardened layer 12 prevents the creation of the damage due to the contact by the pen P so that the external appearance of the keyboard is maintained and the quality of the product is also maintained.

As described hereinabove, according to the present invention, the radius of curvature of the bent area of the upper transparent conductive film caused when the key is depressed is reduced by the multi-layer structure of the upper transparent conductive film and the contact pressure to the lower transparent electrode is dispersed. Accordingly, the breaking of the transparent electrode is prevented and the durability is ramarkably improved.

In an exemplary embodiment conductive films 3 and 6 are made by forming a transparent electrode on the surface of a flexible transparent film. The flexible transparent film is made of polyester, polycarbonate, polysulfone or the like. Such a flexible transparent film is employed in flexible transparent film 9.

Electrodes 4 and 7 are formed by depositing indium oxide or the like on the underlying film 3 or 6. Transparent elastic film 8 is made of polyester, silicone rubber, polyvinyl chloride or the like. Adhesive material 10 is an acrylic adhesive which is transparent. Transparent film 11 is formed from polyester, polycarbonate, polysulfone or the like. The surface hardening agent for hardening the upper surface of film 11 is an epoxy coating material.

What I claim is:

1. A liquid crystal display keyboard including a keyboard having upper and lower transparent conductive films each having transparent electrodes said keyboard being arranged on a liquid crystal display in a spaced and facing relation, characterized in that an elastic member is arranged on said upper transparent conductive film.

2. A liquid crystal display keyboard according to claim 1, wherein the elastic member is an elastic film and is bonded together with a protecting film therefore to an upper surface of said upper transparent conductive film.

3. A liquid crystal display keyboard according to claim 1, wherein a transparent film is bonded by an adhesive material to an upper surface of said upper transparent conductive film and a hardened layer is formed on an upper surface of said transparent film.

4. A liquid crystal display keyboard comprising:
   a liquid crystal display;
   a pair of transparent electrodes arranged on said liquid crystal display;
   a flexible transparent film for holding one of said pair of transparent electrodes; and
   a second transparent film bonded by an adhesive material to said flexible transparent film.

5. A liquid crystal display keyboard according to claim 4, wherein said second transparent film has a hardened layer formed thereon.

* * * * *